United States Patent [19]

Koike

[11] Patent Number: 4,809,926
[45] Date of Patent: Mar. 7, 1989

[54] WEBBING RETRACTOR

[75] Inventor: Kiyokazu Koike, Kanagawa, Japan

[73] Assignee: Nippon Seiko Kabushiki Kaisha, Kanagawa, Japan

[21] Appl. No.: 60,452

[22] Filed: Jun. 11, 1987

[30] Foreign Application Priority Data

Jun. 21, 1986 [JP] Japan .............................. 61-94018[U]

[51] Int. Cl.⁴ .............................................. B60R 22/40
[52] U.S. Cl. ...................... 242/107.4 B; 242/107.4 R
[58] Field of Search .................. 242/107.4 R, 107.4 A, 242/107.4 B, 107.4 D; 280/806; 297/478

[56] References Cited

U.S. PATENT DOCUMENTS

| | | | |
|---|---|---|---|
| 3,482,799 | 12/1969 | Wrighton | 242/107.4 |
| 3,836,171 | 9/1974 | Hayashi et al. | |
| 3,876,163 | 4/1975 | Kobrehel | 242/107.4 D X |
| 4,436,255 | 3/1984 | Matsui et al. | 242/107.4 A |
| 4,467,980 | 8/1984 | Fohl | 242/107.4 A X |
| 4,518,132 | 3/1985 | Schmidt | 242/107.4 A |
| 4,552,319 | 11/1985 | Gavagan et al. | 242/107.4 A |
| 4,555,074 | 11/1985 | Kawai et al. | 242/107.4 A |
| 4,555,075 | 11/1985 | Schmidt et al. | 242/107.4 A |
| 4,565,338 | 1/1986 | Takada | 242/107.4 B |
| 4,566,649 | 1/1986 | Petersen, III | 242/107.4 A |
| 4,573,646 | 3/1986 | Willey | 242/107.4 A |
| 4,575,021 | 3/1986 | Higbee | 242/107.4 A |
| 4,597,546 | 7/1986 | Yamamoto et al. | 242/107.4 A |
| 4,635,874 | 1/1987 | Swindlehurst | 242/107.4 B |
| 4,726,539 | 2/1988 | Schmidt et al. | 242/107.4 A |

Primary Examiner—John M. Jillions
Attorney, Agent, or Firm—Wegner & Bretschneider

[57] ABSTRACT

A webbing retractor is equipped with a lock preventing means for maintaining a lock member out of engagement with a lockable member, e.g., a latch plate fixed on a take-up spring during an initial release stage of a webbing, even when an emergency locking mechanism causes the lock member to start moving toward a position where the lock member is engageable with the lockable member.

13 Claims, 5 Drawing Sheets ns
WEBBING RETRACTOR

BACKGROUND OF THE INVENTION (1) Field of the Invention

This invention relates to a webbing retractor which is equipped with an emergency locking mechanism and an automatic locking mechanism - which once the rotation of a take-up spindle in a webbing-releasing direction is locked, continuously locks the rotation of the take-up spindle in the webbing-releasing direction unless this locking is released by a certain operation - and allows to change the automatic locking mechanism from a state ready to actuate to a state not ready to actuate and vice versa by suitably changing the wound state of the webbing on the take-up spindle. The webbing retractor is also provided with a means for preventing locking of the take-up spindle in the webbing-releasing direction when such locking is not needed, even when the emergency locking mechanism is actuated to lock the rotation of the take-up spindle in the webbing-releasing direction.

(2) Description of the Prior Art

Retractors equipped only with emergency locking mechanisms have been known to date, and so are retractors with automatic locking mechanisms alone. Even while webbings are worn, the former retractors still permit a relatively greater degree of freedom to the wearers and the wearers do not feel too much pressure from the webbings. The release of webbing is prevented in the case of the latter retractors and the wearers hence feel relatively large pressures from the webbings.

Baggage or an auxiliary child's seat (hereinafter called "baggage" collectively) is sometimes strapped on a conventional passenger seat by using its associated webbing. In the case of an automatic locking retractor, the release of the webbing is prevented when the baggage is strapped. Therefore, the baggage is firmly held on the seat. However, the release of the webbing is not prevented normally in the case of an emergency locking retractor. There is hence an imminent danger that the webbing is pulled out little by little from the retractor by vibrations and moderate braking and the strapping of the baggage becomes looser while the car is driven.

It is hence desired to develop a retractor having the merits of both an emergency locking retractor and an automatic locking retractor.

When certain predetermined conditions arise, an emergency locking mechanism always takes it as occurrence of an emergency state and hence functions. The emergency locking mechanism may therefore function to lock the release of its associated webbing even when there is actually no emergency state. The emergency locking mechanism may hence function, for example, when the webbing is taken up rapidly into a fully-wound state, the release of the webbing is started from the fully-wound state, or the vehicle body is tilted beyond a certain degree on a slope.

It is therefore desired to solve such inconvenience by a simple structure.

SUMMARY OF THE INVENTION

An object of this invention is therefore to provide a webbing retractor which can meet the above-described demand, namely, which is equipped with an emergency locking mechanism and automatic locking mechanism, which are reasonable in both structure and operation and function without failure, and a means for preventing the locking of a webbing when such locking is not needed.

In one aspect of this invention, there is thus provided a webbing retractor comprising:

a take-up spindle means biased in a webbing-winding direction;

a lockable member secured fixedly on said take-up spindle means;

a lock member displaceable between a first position, where the lock member is engageable with the lockable member so as to prevent any further rotation of said take-up spindle means in a webbing-releasing direction, and a second position where the lock member is out of engagement with the lockable member, said lock member assuming the second position normally;

a control means for bringing the lock member to the first position when a webbing has been rewound on said take-up spindle means subsequent to a release of the webbing over a predetermined first length thereof from said take-up spindle means or to the second position when the webbing has been wound on said take-up spindle means over a predetermined second length thereof;

an emergency locking mechanism for sensing an emergency state and then causing the lock member, which is at the second position, to start moving toward the first position; and a lock preventing means for maintaining the lock member at the second position during an initial release stage of the webbing, in which the released length of the webbing is shorter than the first length, even when the emergency locking mechanism causes the lock member to start moving toward the first position.

In another aspect of this invention, there is also provided a webbing retractor comprising:

a take-up spindle means biased in a webbing-winding direction;

a lockable member secured fixedly on said take-up spindle means;

a lock member displaceable between a first position, where the lock member is engageable with the lockable member to prevent any further rotation of said take-up spindle means in a webbing-releasing direction, and a second position where the lock member is out of engagement with the lockable member;

a pawl spring capable of assuming selectively either a first state, in which the pawl spring biases the lock member toward the first position, or a second state in which the pawl spring biases the lock member toward the second position;

a control means for bringing the pawl spring into the first state when a webbing has been released over a predetermined first length thereof from said take-up spindle means or into the second state when the webbing has been wound over a predetermined second length thereof on said take-up spindle means; and a means provided on the lock member, said means being brought into engagement with a part of said control means and preventing the lock member from moving to the first position before the pawl spring changes from the second state to the first state but when the webbing released over the predetermined first length thereof is rewound on said take-up spindle means, said means being disengaged from the part of said control means to permit the movement of the lock member to the first position.

In a further aspect of this invention, there is also provided a webbing retractor comprising:

a take-up spindle means biased in a webbing-winding direction;

a lockable member secured fixedly on said take-up spindle means;

a lock member displaceable between a first position, where the lock member is engageable with the lockable member to prevent any further rotation of said take-up spindle means in a webbing-releasing direction, and a second position where the lock member is out of engagement with the lockable member;

an emergency locking mechanism for sensing a change of at least a predetermined value in the releasing speed of the webbing and then causing the lock member, which is at the second position, to start moving toward the first position; and a gear holder connected to said take-up spindle means by way of a reduction gear train and defining cam portions respectively over desired angular ranges on the outer periphery thereof, said cam portions being brought into engagement with the lock member to prevent the lock member from moving to the first position when the webbing, which has been wound over the entire length thereof, is released.

In a still further aspect of this invention, there is also provided a webbing retractor comprising:

a casing having a pair of side walls provided opposite to each other;

a take-up spindle means supported rotatably on the casing and biased in a webbing-winding direction;

a plate-like lockable member secured fixedly on said take-up spindle means and defining a plurality of teeth in the outer periphery thereof with angular intervals, said lockable member being positioned outside one of the side walls;

a plate-like lock member displaceable between a first position, where the lock member is engageable with the lockable member to prevent any further rotation of said take-up spindle means in a webbing-releasing direction, and a second position where the lock member is out of engagement with the lockable member, said lock member defining plural teeth engageable with the teeth of the lockable member; and a means for preventing the lock member from being deformed in a direction away from said one side wall when a force is applied from the lockable member to the lock member.

According to the present invention, the automatic locking mechanism can be brought into an actuated state by a simple webbing operation and the lock preventing means, which prevents the locking of release of the webbing when the emergency locking mechanism functions in spite of absence of need for such webbing locking, has such a structure that the lock preventing means can be materialized as a simple mechanism. It is therefore possible to provide a webbing retractor having a simple overall structure although it is equipped with many functions.

The control means may comprise, for example, a cam member movable responsive to each rotation of said take-up spindle means, a bias-member control member capable of being brought into a relation either engaged with or disengaged from the cam member in accordance with a rotation of said take-up spindle means, and a bias member interposed between the bias-member control member and the lock member and controlled by the control member so as to change the direction of a bias force acting on the lock member; said lock preventing means is provided on the cam member and lock member; and the emergency lock mechanism has a structure such that when the emergency locking mechanism is actuated while said lock preventing means is in operation, a force causing the lock member to start moving toward the first position is absorbed at a part of the emergency locking mechanism so as to avoid the application of any undue force to the lock member. It is hence possible to provide a webbing retractor having many functions while enjoying a simple structure and fail-free operation.

BRIEF DESCRIPTION OF THE DRAWINGS

The above and other objects, features and advantages of this invention will become apparent from the following description and the appended claims, taken in conjunction with the accompanying drawings, in which:

DETAILED DESCRIPTION OF THE INVENTION AND PREFERRED EMBODIMENT

Figure 1:
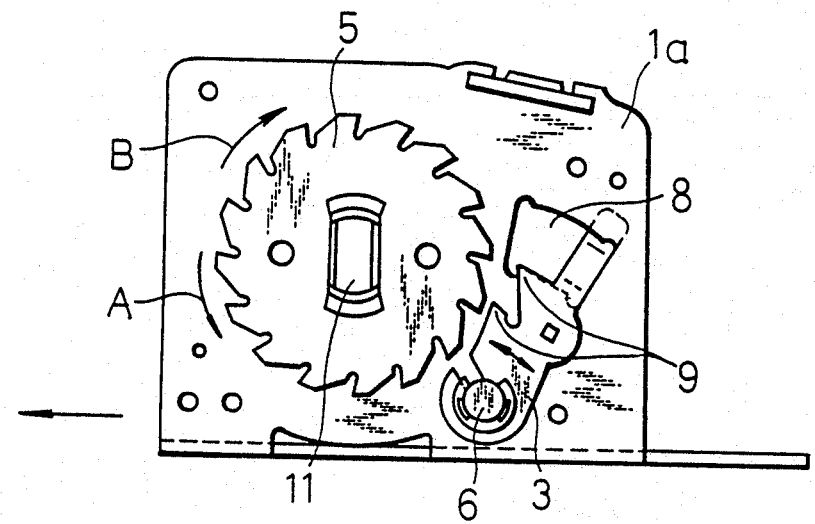
FIG. 1 is a front view of a retractor according to one embodiment of this invention, in which the retractor has been assembled partly.
Figure 2:
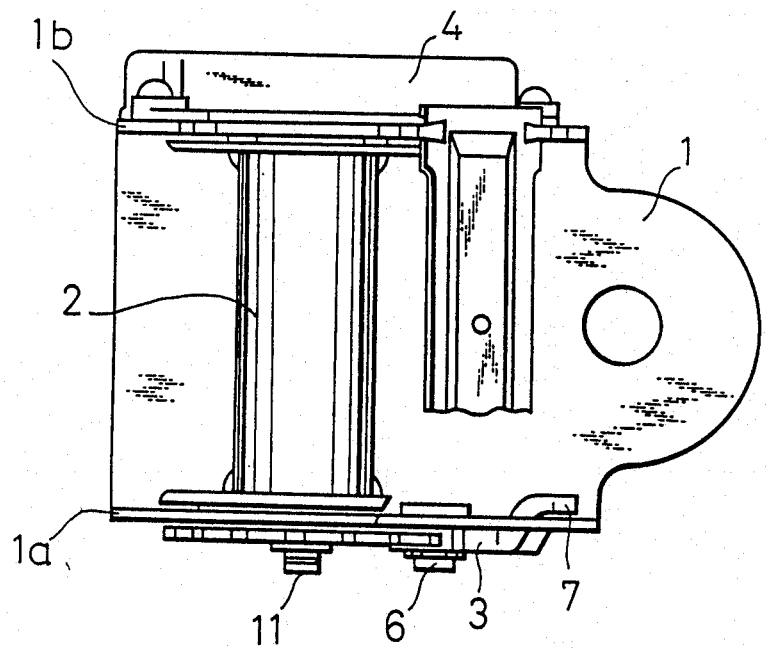
FIG. 2 is a plan view of the retractor.

In FIGS. 1 and 2, a take-up spindle 2 as a take-up spindle means and a pawl 3 as a lock member are assembled on a casing 1 which has a pair of side walls 1a,1b arranged opposite to each other. The take-up spindle 2 is biased in a webbing-winding direction, which is indicated by an arrow A in FIG. 1, by a take-up spring (not shown) in a spring cover 4.

A latch plate 5, which defines teeth with equal angular intervals in the outer periphery thereof and serves as a lockable member, is fixedly secured on the take-up spindle 2 so that the latch plate 5 rotates together with the take-up spindle 2. The pawl 3 is swingable about a pawl pin 6. The swinging motion of the pawl 3 is however limited within a predetermined range through the contact between a slide lug 7 of the pawl 3 and both ends of a guide slot 8 formed through the side wall 1a. The pawl 3 has two locking teeth 9. By the engagement of these locking teeth 9 with the teeth of the latch plate 5, the take-up spindle 2 is prevented from rotating in a webbing-releasing direction, namely, in a direction indicated by an arrow B in FIG. 1.

Since the pawl 3 and latch plate 5 engage at two points as described above, it is possible to obtain desired strength by forming them with a thin plate-like material. This advantage can therefore contribute to the prevention of increased external dimensions and the reduction of both weight and cost.

Figure 3:
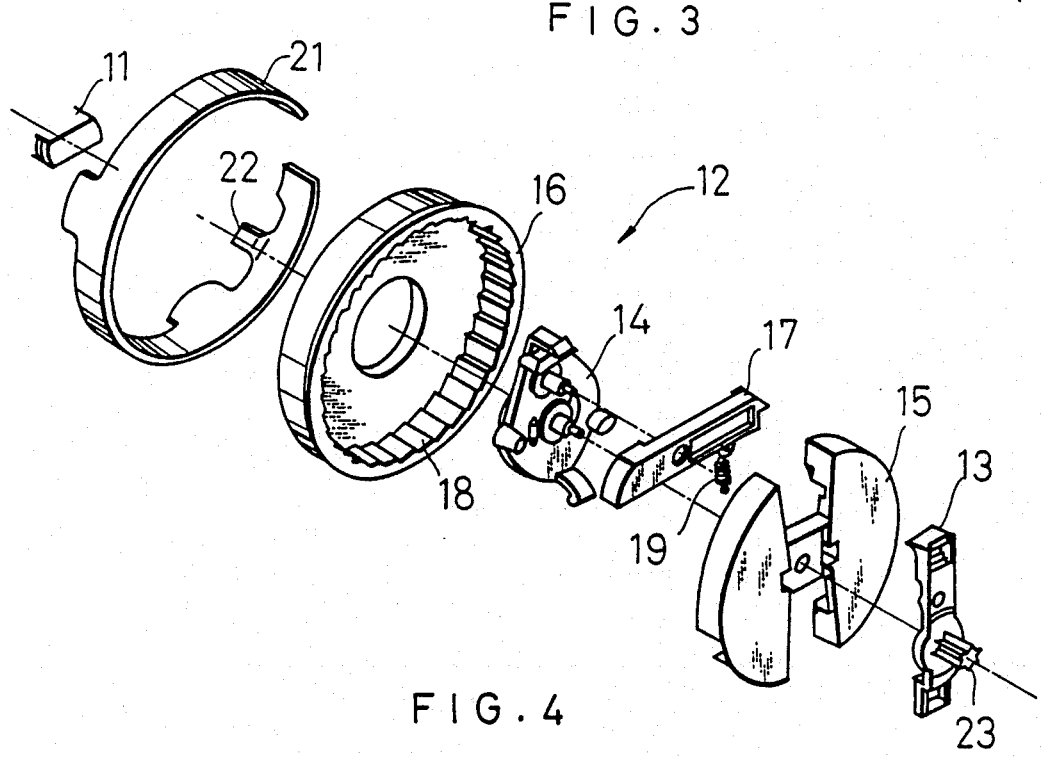
FIG. 3 is an exploded perspective view of an emergency locking mechanism.

FIG. 3 illustrates a webbing-sensing emergency locking mechanism 12 provided on an outer end portion of the take-up spindle 2. The emergency locking mechanism 12 includes a retainer flange 13 and flange 14 which rotate together with the take-up spindle 2, an inertia member 15 and latch cup 16 which can rotate relative to the take-up spindle 2, a lock piece 17 provided swingably on the flange 14, a spring 19 biasing the lock piece 17 in a direction that the lock piece 17 does not engage internal teeth 18 of the latch cup 16, and a clutch spring 21 maintained in frictional engagement with the latch cup 16.

The clutch spring 21 has a finger 22 which is engageable with the pawl 3. The retainer flange 13 has a sun gear 23 which takes a role to be described subsequently.

Figure 4:
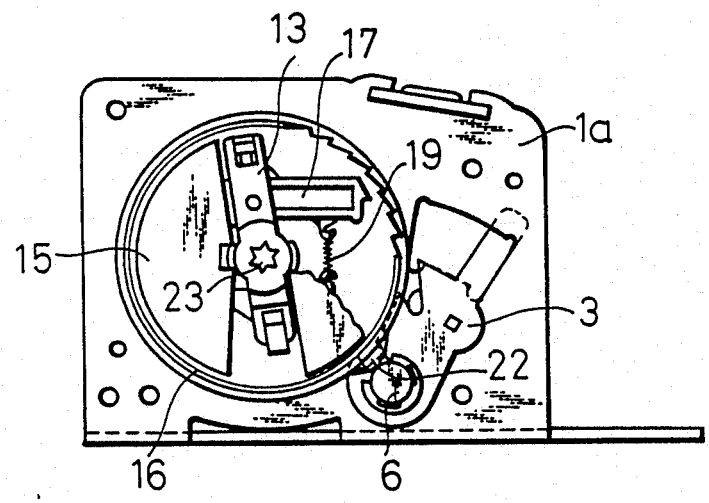
FIG. 4 is a front view showing the emergency locking mechanism of FIG. 3 in a state assembled partly.

In FIG. 4, the emergency locking mechanism 12 is illustrated in its assembled state.

The emergency locking mechanism 12 functions in the following manner. When the take-up spindle 2 rotates at an acceleration of at least a predetermined value in the webbing-releasing direction, the inertia member 15 rotates with a lag relative to the take-up spindle 2 so that the inertia member 15 causes the lock piece 17 to swing against the bias force of the spring 19 to a position where the lock piece 17 is brought into engagement with any one of the internal teeth 18 of the latch cup 16. As a result, the latch cup 16 also begins to rotate in the webbing-releasing direction. In addition, the clutch spring 21 which is in frictional engagement with the latch cup 16 also rotates in the same direction. The finger 22 is hence brought into engagement with the pawl 3, whereby the pawl 3 is swung in the counter-clockwise direction as viewed in FIG. 1 to bring the pawl 3 into engagement with the latch plate 5.

Figure 5:
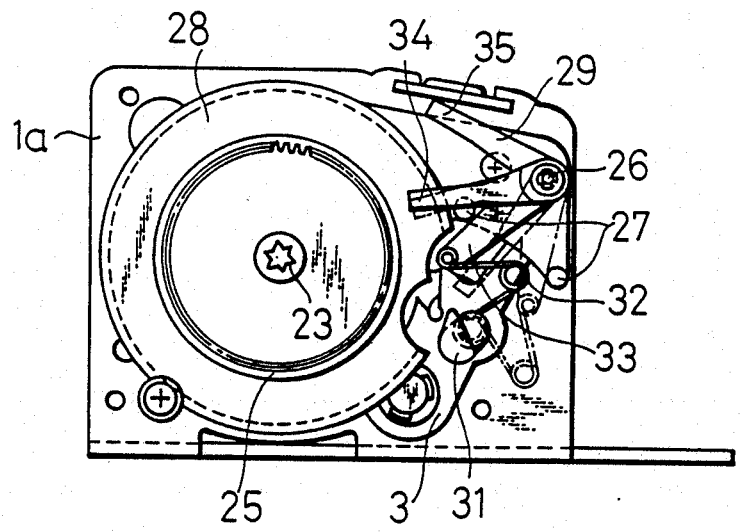
FIG. 5 is a front view of the emergency locking mechanism of FIG. 3 in a state assembled further from the state depicted in FIG. 4.

Referring next to FIG. 5, fixed further on the casing 1 are an internal gear 25, a sway arm support pin 26 and a sensor cover 28 having a sway arm stopper 27. A sway arm 29 is swingably supported on the support pin 26. The swingable range of the sway arm 29 is limited by the stopper 27. A sensing piece 31 is provided fixedly on the pawl 3. A pawl spring 32 is also provided between the sway arm 29 and sensing piece 31. In a state shown by solid lines in FIG. 5, the pawl spring 32 biases the pawl 3 toward a second position, namely, a non-locking position. In a state depicted by alternate long and short dash lines, the pawl spring 32 biases the pawl 3 toward a first position, namely, a locking position.

The sway arm 29, which serves as a bias-member control member, has first, second and third arms 33,34,35.

Figure 6:
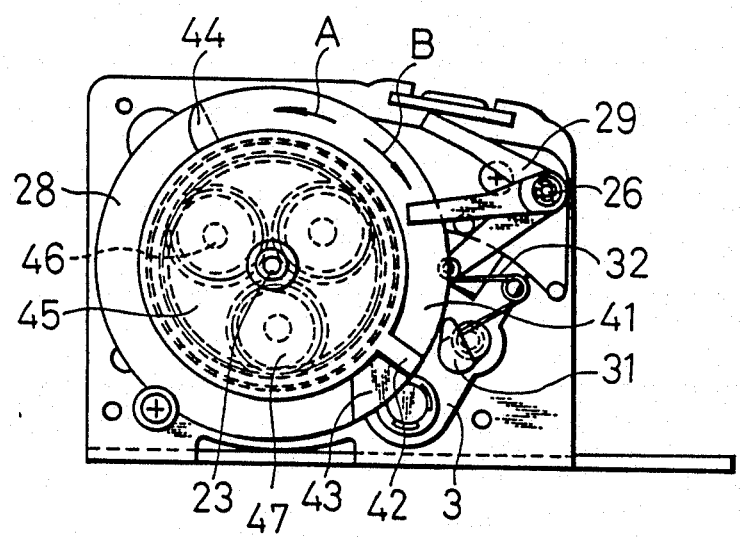
FIGS. 6–10 are front views showing the operation of the retractor in different stages.

In FIG. 6, a gear holder 45 having a cam portion 41 and first, second and third cams 42,43,44 along the periphery thereof and three planetary gears 47 supported rotatably on support pins 46, which are in turn supported on the gear holder 45, have been assembled in addition to the state of assembly depicted in FIG. 5. First cam 42 projects above cam portion 41 and third cam 44 projects below cam portion 41, as viewed in FIGS. 6–10.

The planetary gears 47 are maintained in engagement with the sun gear 23 and the internal gear 25 in the sensor cover 28. Accordingly, the gear holder 45 rotates in the same direction as the take-up spindle 2, i.e., the sun gear 23 by way of such a gear train.

In the state illustrated in FIG. 6, the webbing has been wound fully. In this state, the sensing piece 31 is in engagement with the cam portion 41 of the gear holder 45 and the pawl 3 cannot swing toward the locking position at which the pawl 3 engages the latch plate 5. Even if the emergency locking mechanism 12 functions in this state, slipping takes place between the latch cup 16 and clutch spring 21 so that the pawl 3 cannot lock the latch plate 5. It is therefore possible to avoid the lock-up phenomenon, which occurs as a result of locking of the latch plate 5 by the pawl 3 when the webbing has been wound fully, and the inconvenient situations that the webbing cannot be pulled out even if one tries to pull it out in the fully-wound state of the webbing.

The control means is constructed of the sun gear 23, sensor cover 28, planetary gears 47, gear holder 45, sway arm 29, pawl spring 32 and sensing piece 31. The lock preventing means is composed of the sensing piece 31 provided on the pawl 3 and the cam portion 41 formed on the gear holder 45. The bias means is formed of the sway arm 29 and the pawl spring 32 as the bias member. On the other hand, a detection means is constructed of the sun gear 23, sensor cover 28, planetary gears 47 and gear holder 45.

The operation of the automatic locking mechanism will hereinafter be described.

When the webbing is pulled out from the fully-wound state shown in FIG. 6 in which the sway arm 29 and pawl spring 32 are in a second state, namely, the state wherein the pawl is biased toward the non-locking position, the gear holder 45 rotates in the direction indicated by the arrow B in FIG. 6, namely, in the webbing-releasing direction. Shortly before the full extension (i.e., upon release of the webbing over a desired first length), the webbing retractor is brought into a state depicted in FIG. 7. In other words, the first cam 42 of the gear holder 45 is right before its downward contact with the second arm 34 in the state of FIG. 7.

Figure 8:
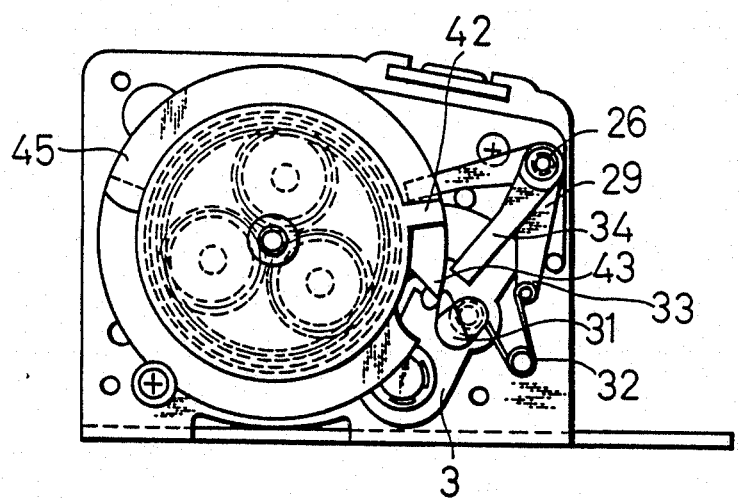

When the webbing is pulled out further from the above state to the full extension, the second arm 34 is kicked by the first cam 42 and the sway arm 29 is hence caused to swing counterclockwise about the support pin 26. As a result, the pawl spring 32 held between the first arm 33 and sensing piece 31 takes a state shown in FIG. 8 (i.e., a first state) so that pawl 3 is urged toward the locking position. Here, the second cam 43 is brought into contact with the sensing piece 31 as shown in FIG. 8 before the sway arm 29 and pawl spring 32 move into the first state. The pawl 3 is hence allowed to remain at the non-locking position although the pawl 3 is biased toward the locking position.

Figure 9:
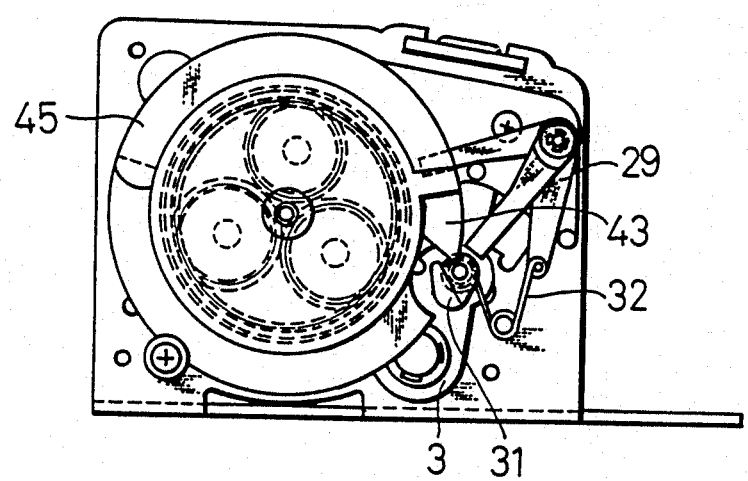

When the webbing is then wound slightly from the fully-released state of FIG. 8, the gear holder 45 turns slightly in the webbing-winding direction accordingly so that the second cam 43 is disengaged from the sensing piece 31 as shown in FIG. 9. The pawl 3 which has already been biased toward the locking position by the pawl spring 32 is hence brought into engagement with the latch plate 5, whereby the rotation of the take-up spindle 2 in the webbing-releasing direction is locked. Automatic locking has now been completed.

The release of the automatic locking is effected in the following manner.

Figure 10:
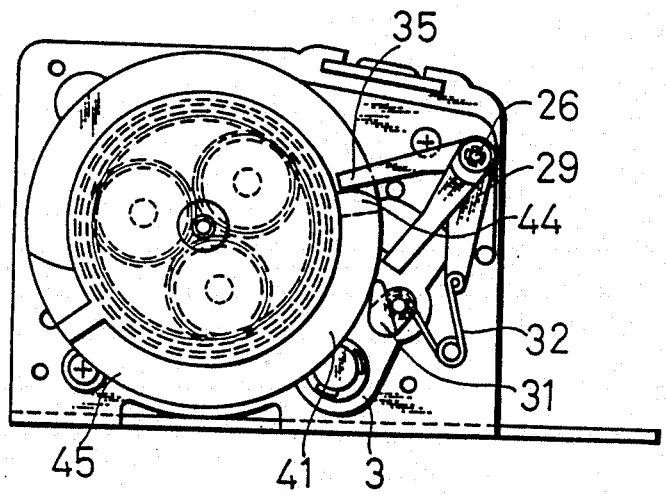

When the webbing is taken up from the state of FIG. 9, the gear holder 45 also rotates in the webbing-winding direction, i.e., counterclockwise. As depicted in FIG. 10, the cam portion 41 is then brought into engagement with the sensing piece 31 to bring the pawl 3 to the non-locking position. When the webbing has been wound over the predetermined second length, the third cam 44 is brought into contact with the third arm 35 of the sway arm 29 so that the sway arm 29 is caused to swing clockwise about the support pin 26. Accordingly, the sway arm 29 and pawl spring 32 return to the second state shown in FIG. 6. When the webbing is taken up further, the fully-wound state of FIG. 6 is achieved. The automatic locking has now been released.

Figure 7:
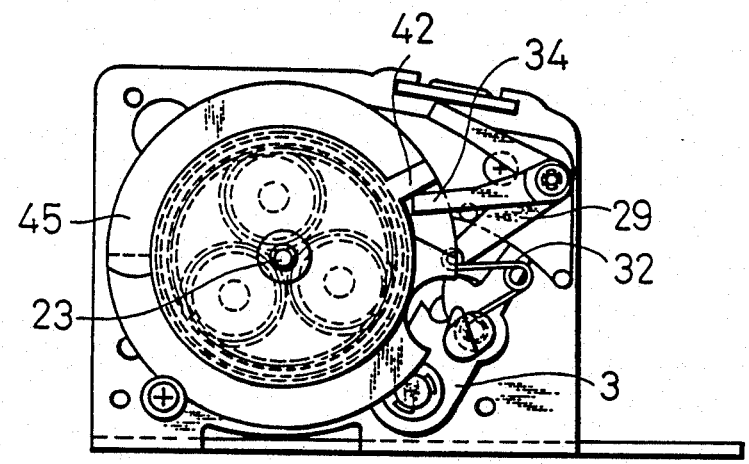

Between the state in which the webbing has been pulled out slightly from the fully-wound state of FIG. 6 and the state in which the webbing is in a state slightly before its fully-released state of FIG. 7, the pawl 3 is biased toward the non-locking position but upon actuation of the emergency locking mechanism 12, the pawl 3 is brought to the locking position to lock the release of the webbing. Namely, the emergency locking mechanism 12 is allowed to function normally in any state of use of the webbing between the aforementioned two states so that the wearer of the webbing is restrained in safety.

Having now fully described the invention, it will be apparent to one of ordinary skill in the art that many changes and modifications can be made thereto without departing from the spirit or scope of the invention as set forth herein.

I claim:

1. A webbing retractor comprising:
    a take-up spindle means biased in a webbing-winding direction;
    a lockable member secured fixedly on said take-up spindle means;
    a lock member displaceable between a first position, where the lock member is engageable with the lockable member so as to prevent any further rotation of said take-up spindle means in a webbing-releasing direction, and a second position where the lock member is out of engagement with the lockable member, said lock member assuming the second position normally;
    a control means for bringing the lock member to the first position when a webbing has been rewound on said take-up spindle means subsequent to a release of the webbing over a predetermined first length thereof from said take-up spindle means or to the second position when the webbing has been wound on said take-up spindle means over a predetermined second length thereof;
    an emergency locking mechanism for sensing an emergency state and then causing the lock member, which is at the second position, to start moving toward the first position; and
    a lock preventing means for maintaining the lock member at the second position during an initial release stage of the webbing, in which the released length of the webbing is shorter than the first length, even when the emergency locking mechanism causes the lock member to start moving toward the first position.

2. The webbing retractor as claimed in claim 1, wherein when the webbing has been taken up on said take-up spindle means over the entire length thereof and when the webbing is released from the fully-wound state thereof, the lock preventing means maintains the lock member at the second position even when the emergency locking mechanism causes the lock member to start moving toward the first position.

3. The webbing retractor as claimed in claim 1, wherein the emergency locking mechanism is of the webbing sensing type that the emergency locking mechanism causes the lock member to start moving toward the first position upon sensing that the webbing is about to be released at an acceleration of at least a predetermined value from said take-up spindle means.

4. The webbing retractor as claimed in claim 1, wherein the emergency locking mechanism has such a structure that when the emergency locking mechanism is actuated while said lock preventing means is in operation, slipping takes place at a part of the emergency locking mechanism and a force causing the lock member to start moving toward the first position is absorbed at the part.

5. The webbing retractor as claimed in claim 1, wherein said control means comprises a cam member movable responsive to each rotation of said take-up spindle means, a bias-member control member capable of being brought into a relation either engaged with or disengaged from the cam member in accordance with a rotation of said take-up spindle means, and a bias member interposed between the bias-member control member and the lock member and controlled by the control member so as to change the direction of a bias force acting on the lock member; said lock preventing means is provided on the cam member and lock member; and the emergency lock mechanism has a structure such that when the emergency locking mechanism is actuated while said lock preventing means is in operation, a force causing the lock member to start moving toward the first position is absorbed at a part of the emergency locking mechanism so as to avoid the application of any undue force to the lock member.

6. The webbing retractor as claimed in claim 1, wherein said control means comprises:
    a bias means capable of taking a first state, in which said bias means biases the lock member toward the first position, or a second state in which said bias means biases the lock member toward the second position;
    a sensing piece attached as a unitary member to the lock member; and
    a detection means for detecting the release of the webbing from said take-up spindle means over the predetermined first length thereof so as to bring said bias means into the first state, engaging the sensing piece and maintaining the lock member at the second position until the webbing is rewound on said take-up spindle means subsequent to the release of the webbing over the predetermined first length, and bringing the bias means into the second state upon sensing the winding of the webbing on said take-up spindle means over the predetermined second length thereof.

7. The webbing retractor as claimed in claim 6, wherein said detection means comprises a gear train and a cam member rotatable via the gear train in accordance with the rotation of said take-up spindle means.

8. The webbing retractor as claimed in claim 6, wherein said lock preventing means is composed of the sensing piece and a cam portion formed on the detection means, and the cam portion is engageable with the sensing piece to maintain the lock member at the second position.

9. A webbing retractor comprising:
    a take-up spindle means biased in a webbing-winding direction;
    a lockable member secured fixedly on said take-up spindle means;
    a lock member displaceable between a first position, where the lock member is engageable with the lockable member to prevent any further rotation of said take-up spindle means in a webbing-releasing direction, and a second position where the lock member is out of engagement with the lockable member;
    a pawl spring capable of assuming selectively either a first state, in which the pawl spring biases the lock member toward the first position, or a second state in which the pawl spring biases the lock member toward the second position;

a control means for bringing the pawl spring into the first state when a webbing has been released over a predetermined first length thereof from said take-up spindle means or into the second state when the webbing has been wound over a predetermined second length thereof on said take-up spindle means; and a means provided on the lock member, said means being brought into engagement with a part of said control means and preventing the lock member from moving to the first position before the pawl spring changes from the second state to the first state but when the webbing released over the predetermined first length thereof is rewound on said take-up spindle means, said means being disengaged from the part of said control means to permit the movement of the lock member to the first position.

10. The webbing retractor as claimed in claim 9, wherein said control means comprises a gear holder connected to said take-up spindle means by way of a reduction gear train and a sway arm connected to the pawl spring and operated by the gear holder.

11. The webbing retractor as claimed in claim 10, wherein the gear holder comprises a first cam facing the webbing releasing direction and a third cam facing the webbing winding direction, and the sway arm comprises a second arm engageable solely with the first cam and a third arm engageable solely with the third cam.

12. The webbing retractor as claimed in claim 10, wherein the gear holder additionally comprises a second cam extending along the periphery thereof and forming a part of said control means, and said means on the lock member is a sensing piece provided fixedly on the lock member.

13. A webbing retractor comprising:

a casing having a pair of side walls provided opposite to each other;

a take-up spindle means supported rotatably on the casing and biased in a webbing-winding direction;

a plate-like lockable member secured fixedly on said take-up spindle means and defining a plurality of teeth in the outer periphery thereof with angular intervals, said lockable member being positioned outside one of the side walls;

a plate-like lock member displaceable between a first position, where the lock member is engageable with the lockable member to prevent any further rotation of said take-up spindle means in a webbing-releasing direction, and a second position where the lock member is out of engagement with the lockable member, said lock member being positioned outside said one side wall and supported rotatably on said one side wall by a pawl pin which extends through the lock member in the thickness-wise direction thereof; and a means for preventing the lock member from being deformed in a direction away from said one side wall when a force is applied from the lockable member to the lock member, said preventing means comprising a slot formed through said one side wall, a through portion formed at a free end portion of the lock member, bent substantially at a right angle toward said one side wall and extending through the slot, and a lug extending further from the through portion along the inner wall of said one side wall in a direction away from the pawl pin.

* * * * *